United States Patent
Fisk et al.

(10) Patent No.: US 8,939,498 B2
(45) Date of Patent: Jan. 27, 2015

(54) VEHICLE FLOOR TUB HAVING A SOUND DAMPING PATCH

(75) Inventors: Jonathan W. Fisk, Canton, MI (US); Stephen A. Fetsko, Medina, OH (US)

(73) Assignee: Shiloh Industries, Inc., Valley City, OH (US)

( * ) Notice: Subject to any disclaimer, the term of this patent is extended or adjusted under 35 U.S.C. 154(b) by 311 days.

(21) Appl. No.: 13/498,271

(22) PCT Filed: Oct. 21, 2010

(86) PCT No.: PCT/US2010/053589
§ 371 (c)(1),
(2), (4) Date: Mar. 26, 2012

(87) PCT Pub. No.: WO2011/050187
PCT Pub. Date: Apr. 28, 2011

(65) Prior Publication Data
US 2012/0181811 A1    Jul. 19, 2012

Related U.S. Application Data

(60) Provisional application No. 61/253,795, filed on Oct. 21, 2009.

(51) Int. Cl.
*B62D 9/00* (2006.01)
*B62D 25/08* (2006.01)
(Continued)

(52) U.S. Cl.
CPC ............. *B62D 25/087* (2013.01); *B60R 13/08* (2013.01); *B62D 43/10* (2013.01); *B62D 25/20* (2013.01); *B21D 22/203* (2013.01)
USPC ................... 296/193.07; 296/39.3; 296/37.2; 296/37.14

(58) Field of Classification Search
USPC ............ 296/193.07, 37.2, 39.3, 37.14, 37.15, 296/37.16; 156/222
See application file for complete search history.

(56) References Cited

U.S. PATENT DOCUMENTS

| 5,271,142 A | 12/1993 | Moore |
| 5,842,686 A | 12/1998 | Hansen et al. |

(Continued)

FOREIGN PATENT DOCUMENTS

| DE | 4307563C2 A1 | 9/1993 |
| EP | 0995511 A2 | 4/2000 |

(Continued)

OTHER PUBLICATIONS

S. Subramanian et al.; SAE 2003-01-1592; "Optimization of Damping Treatment for Structure Borne Noise Redirection"; 13 Pages, Published May 5, 2003: http://papers.sae.org/2003-01-1592.

(Continued)

*Primary Examiner* — Joseph D Pape
(74) *Attorney, Agent, or Firm* — Reising Ethington P.C.

(57) ABSTRACT

A vehicle floor tub is generally designed for attachment to a vehicle floor panel and may have a variety of uses. In one embodiment, the vehicle floor tub may include a sound damping patch applied to the base of the tub for improved vibration or sound damping purposes, thermal insulation, added structural integrity, etc. The vehicle floor tub may include a main panel, a sound damping patch, and an adhesive layer that are formed together from a main blank, a sound damping blank, and an adhesive layer. The sound damping patch may include one or more forming features located near complex stress regions. In one embodiment, the vehicle floor tub may be sized and configured to be a vehicle seat tub that is located in the floor of a vehicle and accommodates a folded or collapsed vehicle seat; in another embodiment, the vehicle floor tub may accommodate a spare wheel.

11 Claims, 5 Drawing Sheets

(51) Int. Cl.
*B60R 13/08* (2006.01)
*B62D 43/10* (2006.01)
*B62D 25/20* (2006.01)
*B21D 22/20* (2006.01)

(56) References Cited

U.S. PATENT DOCUMENTS

| | | |
|---|---|---|
| 5,851,342 A | 12/1998 | Vydra et al. |
| 5,860,687 A * | 1/1999 | Corporon et al. ............ 296/37.2 |
| 6,048,628 A | 4/2000 | Hillmann et al. |
| 6,202,462 B1 | 3/2001 | Hansen et al. |
| 6,592,968 B1 | 7/2003 | Schmit et al. |
| 6,621,658 B1 | 9/2003 | Nashif |
| 7,040,691 B1 | 5/2006 | Jacobs et al. |
| 7,748,184 B1 | 7/2010 | Wheeler et al. |
| 7,784,165 B2 | 8/2010 | Xiao et al. |
| 7,919,174 B2 | 4/2011 | Ruokolainen et al. |
| 2007/0186614 A1 | 8/2007 | Pinard |
| 2008/0236739 A1 | 10/2008 | Ashley |
| 2009/0142538 A1 | 6/2009 | Sigler et al. |
| 2009/0183821 A1 | 7/2009 | Schroeder et al. |
| 2010/0013255 A1 | 1/2010 | Mantovani et al. |
| 2010/0132110 A1 | 6/2010 | Schwaegler |
| 2010/0207290 A1 | 8/2010 | Wheeler et al. |

FOREIGN PATENT DOCUMENTS

| | | |
|---|---|---|
| JP | 2009001185 | 1/2009 |
| KR | 2019970005530 | 2/1997 |
| KR | 2019980007847 | 4/1998 |
| KR | 1020070031651 | 3/2007 |

OTHER PUBLICATIONS

W. Liu et al.; SAE2007-01-2195; Design of Folding Seat Tubs for NVH'; 9 Pages; Published May 15, 2007; http://papers.sae.org/2007-01-2195.

Chinese Office Action dated Aug. 21, 2013 for Chinese Application No. 201080048003.2, Filed Apr. 23, 2012, 13 pages.

Written Opinion & International Search Report for PCT/US10/050388 Jul. 29, 2011, 11 pages.

Mexican Office action dated Jun. 9, 2014, 5 pages.

* cited by examiner

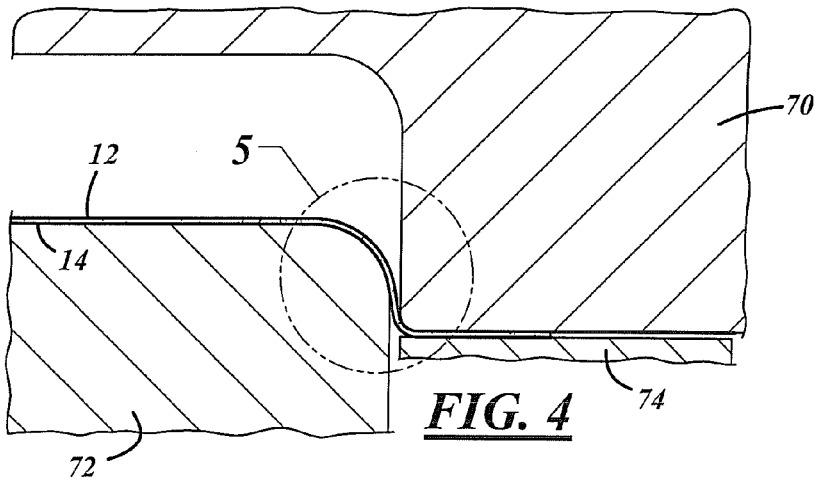
FIG. 4
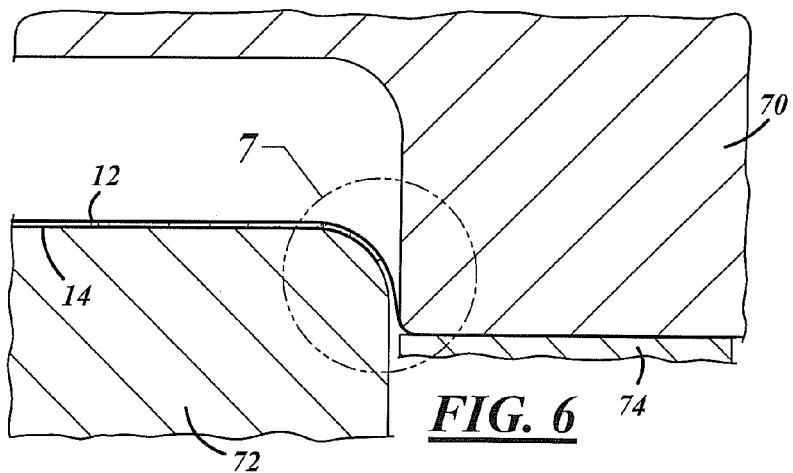
FIG. 6
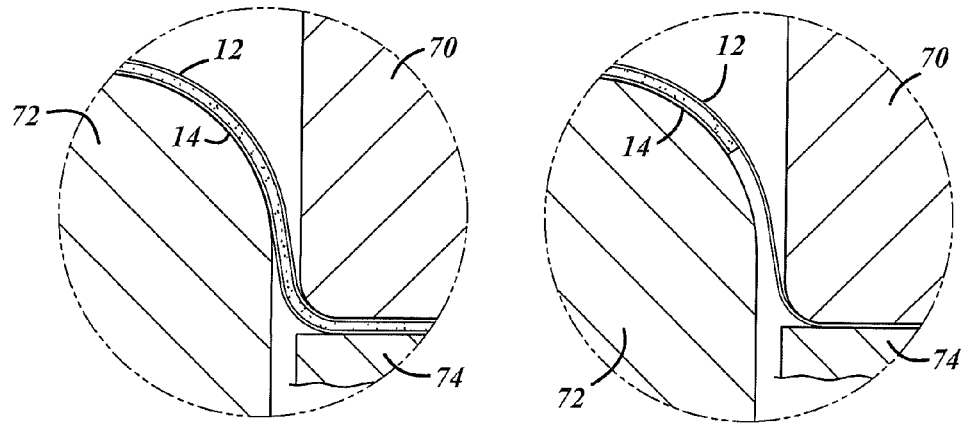
FIG. 5          FIG. 7

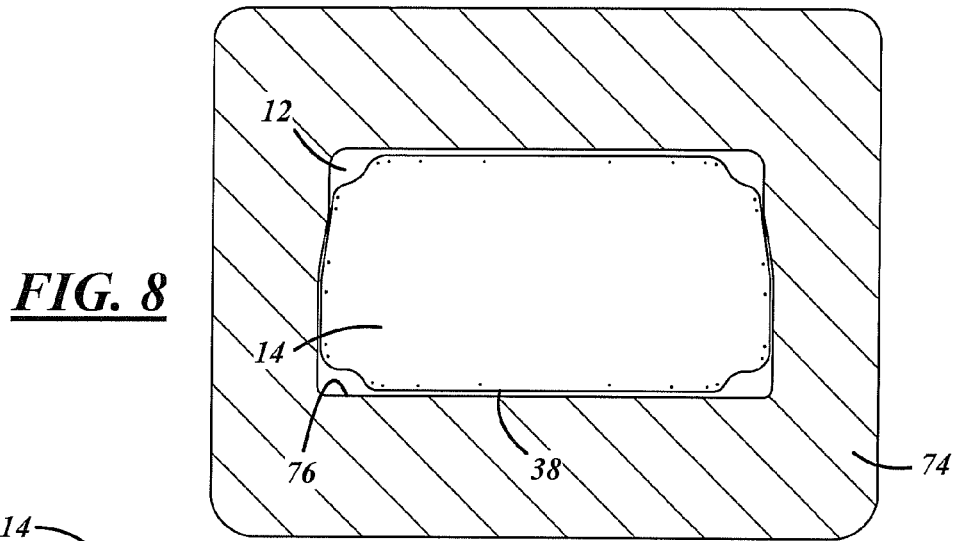
*FIG. 8*
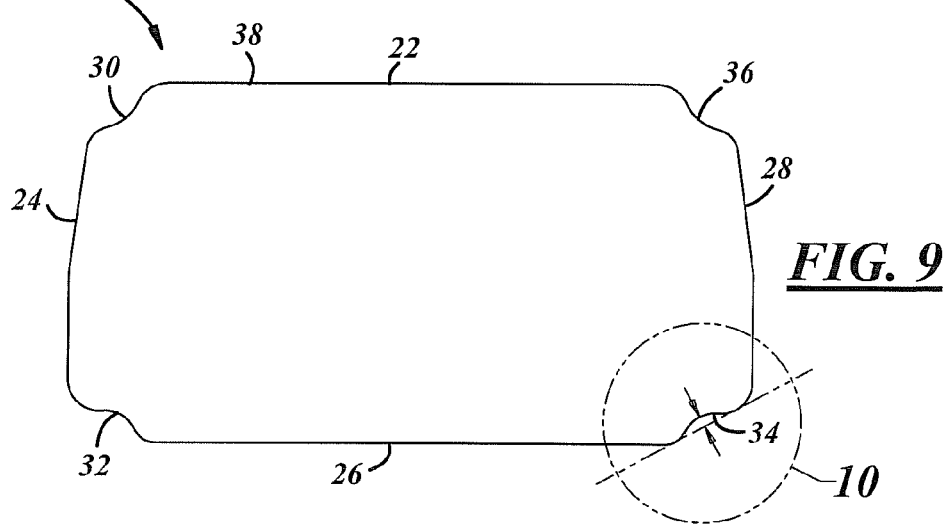
*FIG. 9*
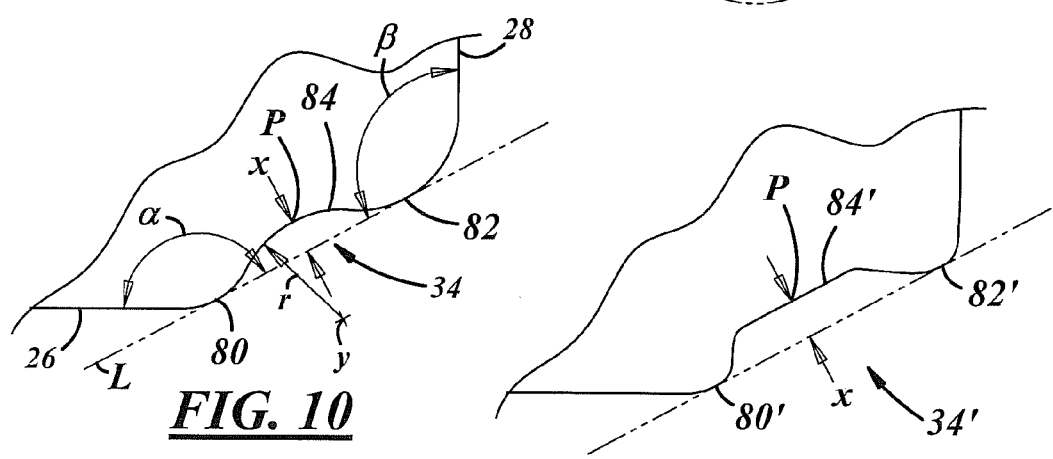
*FIG. 10*
*FIG. 11*

VEHICLE FLOOR TUB HAVING A SOUND DAMPING PATCH

REFERENCE TO RELATED APPLICATIONS

This application claims the benefit of U.S. Provisional Ser. No. 61/253,795 filed on Oct. 21, 2009.

FIELD OF INVENTION

The present invention generally relates to a vehicle floor tub and, more particularly, to a vehicle floor tub that has a sound damping patch for reducing noise and/or vibrations.

BACKGROUND

Vehicle floor tubs find a variety of uses in automobiles and other types of motor vehicles. They can be used for temporary storage and/or concealment of various items beneath the floor of a vehicle, such as vehicle spare wheel and tire assemblies, collapsible passenger seat assemblies, or the personal items of a driver or passenger, such as tools, travel gear, etc. Vehicle floor tubs are typically arranged so that they are accessible from above the floor tub and from inside the vehicle cabin. Because of their close proximity to the ground and their generally hollow interior, vehicle floor tubs may sometimes be a source of unwanted noise that can be transmitted into the vehicle cabin.

SUMMARY

According to one aspect, there is provided a vehicle floor tub that may comprise a main panel, a sound damping patch, and an adhesive layer. The main panel has a bottom wall, a side wall, and a complex stress region that is located near a junction between the bottom wall and the side wall and experiences complex material flow during a forming process. The sound damping patch is smaller than the main panel and has a forming feature. The adhesive layer is in contact with the main panel and the sound damping patch such that the adhesive layer bonds the main panel and the sound damping patch together before the forming process so that the main panel and the sound damping patch can be formed together. During the forming process, the forming feature prevents some of the stress from the complex stress region from transferring from the main panel to the sound damping patch.

According to another aspect, there is provided a vehicle floor tub that may comprise a main panel, a sound damping patch, and an adhesive layer. The main panel has a bottom wall, a side wall, and a bottom edge that is located at a junction between the bottom wall and the side wall and at least partially extends along the length of the junction. The sound damping patch is smaller than the main panel and has a plurality of sound damping features. The adhesive layer is in contact with the main panel and the sound damping patch such that the adhesive layer bonds the main panel and the sound damping patch together before a forming process so that the main panel and the sound damping patch can be formed together. After the forming process the plurality of sound damping features extend from the sound damping patch, through the bottom edge, and at least part way up the side wall of the main panel.

According to another aspect, there is provided an assembly for use in forming a vehicle floor tub that may comprise a substantially flat main blank, a substantially flat sound damping blank, and an adhesive layer. The main blank has an outer perimeter, a bottom wall area, and a side wall area. The sound damping blank has an outer perimeter and a relief notch positioned along the outer perimeter. The outer perimeter of the sound damping blank lies within the outer perimeter of the main blank. The adhesive layer is in contact with the main blank and the sound damping blank such that the adhesive layer bonds the main blank and the sound damping blank together before a forming process so that the main panel and the sound damping patch can be formed together. The sound damping blank is positioned on the main blank so that at least a portion of the relief notch is located on the bottom wall area.

According to another aspect, there is provided a method of forming a vehicle floor tub that may comprise the steps of: (a) providing a main blank, (b) providing a sound damping blank, (c) positioning the sound damping blank on the main blank, (d) joining the sound damping blank to the main blank with an adhesive area, and (e) forming the main blank, the sound damping blank, and the adhesive layer together into a vehicle floor tub. The main blank has a surface area, an outer perimeter, and a complex stress region that experiences complex material flow during a forming process. The sound damping blank has a surface area, an outer perimeter, and a forming feature positioned along the outer perimeter. The surface area of the sound damping blank is smaller than the surface area of the main blank. The sound damping blank is positioned on the main blank such that the forming feature is near the complex stress region. The formed vehicle floor tub has a main panel, a sound damping patch, and an adhesive layer. During the forming process, the forming feature of the sound damping blank prevents some of the stress from the complex stress region from transferring from the main blank to the sound damping blank.

DESCRIPTION OF THE DRAWINGS

A preferred exemplary embodiment of the invention will hereinafter be described in conjunction with the appended drawings, wherein like designations denote like elements, and wherein:

FIG. 4 is a partial cross-sectional view of an exemplary forming die forming a vehicle floor tub, where both the main blank and the sound damping blank are trapped between a binder and an upper die half;

FIG. 5 is an enlarged view of a portion of FIG. 4;

FIG. 6 is a partial cross-sectional view of the forming die of FIG. 4, where the sound damping blank is not pinched between the binder and the upper die half;

FIG. 7 is an enlarged view of a portion of FIG. 6;

FIG. 8 is a cross-sectional view of the forming die of FIG. 6 taken through the binder before forming;

FIG. 9 is a top view of the exemplary sound damping blank of FIG. 1;

FIG. 10 is an enlarged view of an exemplary forming feature of the sound damping blank of FIG. 9, showing an exemplary forming feature;

FIG. 11 is an enlarged view of another exemplary forming feature that may be used with the sound damping blank of FIG. 9;

DESCRIPTION OF PREFERRED EMBODIMENT

Figure 1:
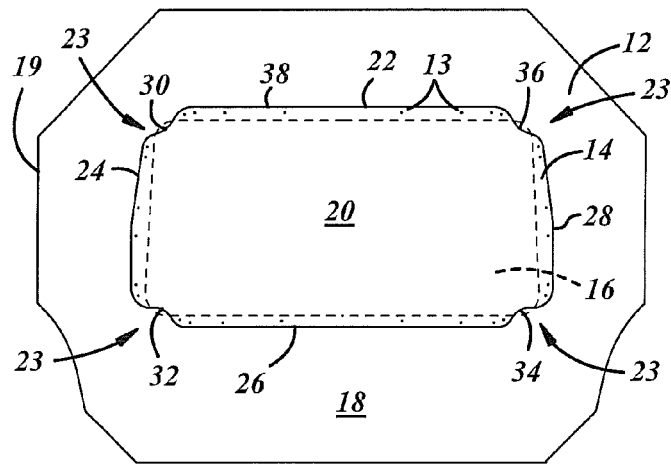
FIG. 1 is a top view of an exemplary assembly that may be used to form a vehicle floor tub and includes a main blank and a sound damping blank.

The vehicle floor tubs described herein are generally designed for attachment to a vehicle floor panel and may have a variety of uses. As used herein, the term 'vehicle floor tub' broadly includes all tubs, cavities or other compartments that are located in the floor of the vehicle, and is not limited to the exemplary embodiments described herein. In one embodiment, the vehicle floor tub is sized and configured to be a vehicle seat tub and located in the floor of a vehicle and accommodates a folded or collapsed vehicle seat. Other examples of vehicle floor tubs include spare tire compartments and various types of storage compartments that may be located in the floor of a vehicle, to name a few. In one embodiment, the vehicle floor tub includes a sound damping patch applied to the base of the tub for improved vibration or sound damping purposes, thermal insulation, added structural integrity, etc. The vehicle floor tub may be used with any type of vehicle including, but certainly not limited to, a car, mini-van, cross-over vehicle, sports utility vehicle (SUV), truck, recreational vehicle (RV), etc. Generally speaking, the vehicle floor tub 10 includes a main panel 12 (formed from a main blank), a sound damping patch 14, (formed from a sound damping blank), and an adhesive layer. Certain features described below (such as the main blank and the main panel, or the sound damping blank and the sound damping patch) generally correspond to one another before and after the vehicle floor tub is formed, and use the same reference numerals. FIG. 1 shows an assembly before a vehicle floor tub is formed, and FIGS. 2-3 show a vehicle floor tub after being formed.

Figure 2:
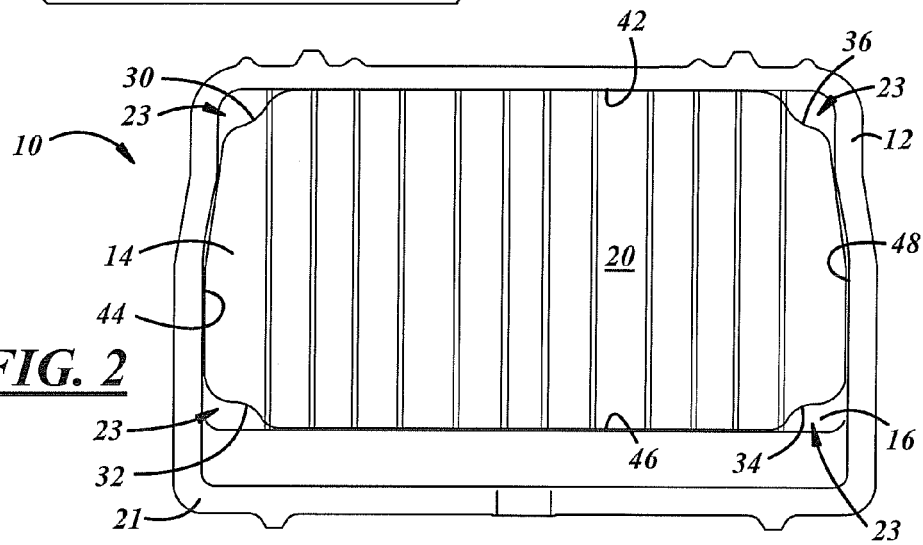
FIG. 2 is a top view of an exemplary vehicle floor tub that can be formed using the exemplary assembly of FIG. 1 and may accommodate a collapsible vehicle seat.
Figure 3:
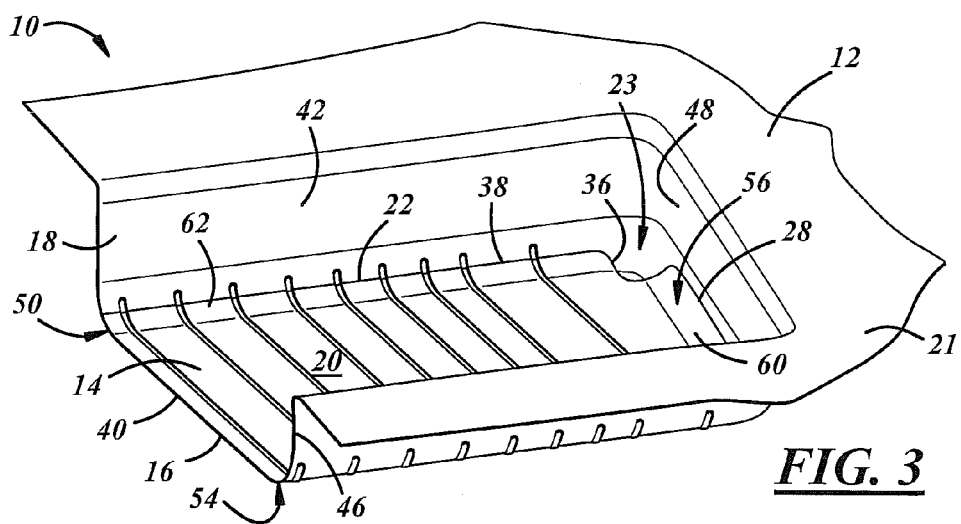
FIG. 3 is a partial perspective view of an exemplary vehicle floor tub similar to that shown in FIG. 2.

Referring to FIGS. 1-3, main panel 12 acts as the structural foundation for vehicle floor tub 10 and is formed from a main blank. Main blank 12 is substantially flat and includes a bottom wall area 16 (inside the phantom line in FIG. 1), a side wall area 18 (outside the phantom line), and an outer perimeter 19. The main blank 12 may also include one or more complex stress regions, which will be described further below. Main blank 12 may be blanked, cut, or otherwise formed into a specific shape that is designed to result in a finished vehicle floor tub once the main blank 12 and the sound damping blank 14 have been formed. As demonstrated in FIG. 1, the main blank 12 is typically larger than sound damping blank 14 and may be made from any number of suitable materials, including metals like various types of low-carbon steel (e.g., extra deep drawing steel (EDDS)). In certain embodiments, the main blank 12 is 0.5-1.5 mm thick, and in some instances may preferably be 0.7-0.9 mm thick. However, the exact size, shape and thickness of main blank 12 is largely driven by the vehicle floor tub or finished part that is desired, and may certainly differ from the exemplary embodiments shown and described here.

Sound damping blank 14 is also substantially flat and includes an outer perimeter 38 and forming features 30-36 located along the outer perimeter 38. It is applied to main blank 12 with an adhesive layer (not shown) so that its outer perimeter 38 lies within the outer perimeter 19 of the main blank 12, and may be positioned on the main blank 12 so that at least a portion of each of the forming features 30-36 is located on the bottom wall area 16 and/or so that each of the forming features 30-36 is located near a complex stress region. This arrangement or configuration is discussed below in more detail. Sound damping blank 14 has a surface area that is smaller than a surface area of the main blank 12 and, after being formed into a sound damping patch, improves the vibration or sound damping characteristics of the formed vehicle floor tub. Sound damping blank 14 may be additionally attached to main blank 12 with a plurality of spot welds 13, as shown in FIG. 1 (the welds are omitted in some of the other figures for purposes of clarity). The spot welds 13 can join the main blank 12 and the sound damping blank 14 together at select weld locations. In this embodiment, the spot welds 13 are arranged near the outer perimeter 38 of the sound damping blank 14. In some instances, it can be useful to include spot welds 13 at certain locations near known complex stress regions to help the sound damping patch maintain its proper location with respect to the main blank during a forming process.

Sound damping blank 14 may be blanked, cut, or otherwise formed into any number of shapes and sizes, but in the embodiment shown here it is generally designed to cover a majority of bottom wall area 16 of the main blank (pre-formed state) and a bottom wall of the vehicle floor tub once both parts are formed into a finished vehicle floor tub 10 (the bottom wall area 16 of the main blank becomes the bottom wall 16 or floor of the vehicle floor tub after it is formed). Although the sound damping patch 14 is shown here located on the inside or interior of the vehicle floor tub, it is also possible for it to be attached to the opposite side of main panel 12 such that it ends up on the outside or exterior of the vehicle floor tub, or for sound damping patches to be attached to both sides of the vehicle floor tub. Sound damping patch 14 may be constructed from any number of suitable materials, including metals like low carbon steels (e.g., EDDS). In one embodiment, the sound damping patch 14 is 0.3-1.0 mm thick, and in some instances may preferably be 0.5-0.7 mm thick, however, the exact size, shape and thickness of the sound damping patch can certainly differ from the exemplary embodiments shown and described here.

Together, main blank 12 and sound damping blank 14 can be formed into a vehicle floor tub 10, such as those shown in FIGS. 2 and 3. In this embodiment, the vehicle floor tub includes main panel 12 and sound damping panel 14. Main panel 12 includes bottom wall 16, side walls 18, upper rim 21, and one or more complex stress regions 23. Sound damping patch 14 is smaller than the main panel 12, and includes forming features 30-36. The structural ribs shown in the bottom wall 16 are optional features, and are not necessary to form the vehicle floor tubs described herein. Where present, though, it may be useful to avoid locating spot welds 13 at locations where ribs will be formed. Upper rim 21 may be used to attach the vehicle floor tub to the rest of the vehicle floor panel. Forming features 30-36 may be located along the outer perimeter 38 of the sound damping patch 14 and near the complex stress regions 23 of main panel 12 to prevent at least some of the stress from the complex stress region from transferring from the main panel 12 to the sound damping patch 14 during the forming process. This feature is described below in more detail.

Complex stress regions 23 are regions or sections of the main blank or the main panel 12 that experience complex material flow during a forming process, such as a stamping, drawing or other metal forming process. Complex material flow generally occurs in a forming process when material is flowing in more than one direction; sometimes referred to as a draw condition. Additionally, material flow during a forming process may include different levels of complexity. For example, complex stress regions 23 may experience bi-directional material flow, material flow in more than two directions, or material flow in nearly all material directions, to cite a few examples. As it pertains to the vehicle floor tubs described herein, an exemplary complex stress region 23 may be located along a junction or edge that is formed between the bottom wall 16 and one of the side walls 18. During the forming process, a multi-directional complex material flow may occur in the area of this junction because the generally flat main blank 12 is being stretched in one direction and bent in another to form a bottom edge of the main panel. Another example of a complex stress region 23 is located near a junction between the bottom wall 16 and two adjacent side walls 18; that is, a bottom corner of the main panel. During the forming process, a multi-directional complex material flow may occur in the area of this junction because the generally flat main blank 12 is being stretched in multiple directions and simultaneously bent in multiple directions to form a bottom corner of the main panel. Complex stress regions may be located along edges, at corners, or in other areas of the main blank or main panel 12 where there is a junction of two or more surfaces. Complex stress regions may simultaneously experience both stretching and compressing of material during a forming process.

In the exemplary embodiments shown in FIGS. 1-3, the sound damping blank and patch 14 is generally rectangular in shape and include a main panel area 20, edges 22-28, and forming features 30-36, the forming features being located at the corners of the rectangular shape. In this embodiment the edges 22-28 and forming features 30-36 define the outer perimeter 38 of the sound damping blank and patch 14. The main panel area 20 covers much of the bottom wall 16 of the vehicle floor tub and is designed to act in a constrained damping layer capacity, with respect to main panel 12. Skilled artisans will appreciate that constrained damping layer constructions can dissipate or otherwise mitigate vibrational energy by utilizing shear and strain within the sandwich-like construction to convert vibrations into low-grade frictional heat. The main panel area 20 may be uniform or non-uniform in thickness and constituency, surface formations, etc. and may assume any suitable size and shape; it is not limited to the exemplary rectangular embodiment shown in the drawings.

Edges 22-28 form a portion of the outer perimeter or periphery 38 of sound damping blank and patch 14 and preferably have a size and shape that is designed to best accommodate the finished part being produced. In some applications, such as the exemplary vehicle floor tubs shown in FIGS. 2 and 3, it may be advantageous for the edges 22-28 of the sound damping patch 14 to extend beyond the tight radii that surround the bottom wall of the vehicle floor tub at the junctions between the bottom wall 16 and side walls 18. This is best demonstrated in FIG. 3, where the vehicle floor tub 10 is shown having a main panel 12 with a deep interior cavity and a horizontal bottom wall 40 surrounded by four vertical side walls 42-48 (wall 44 is not shown in FIG. 3). The radii or junctions between the bottom wall 40 and the vertical side walls 42-48 may be fairly sharp or abrupt; that is, elongated bottom edges 50-56 (bottom edge 52 is not shown in FIG. 3) that extend between the bottom wall and the side walls of the vehicle floor tub are tight bends. The sound damping patch edges 22-28 (24 is not shown, and 26 cannot be seen from the perspective in FIG. 3) terminate somewhere on respective side walls 42-48 (44 is not shown), such that the sound damping patch 14 extends somewhat through the tight bottom edges 50-56 of the underlying main panel 12.

In some cases, such as with sound damping patch edge 28, it may be desirable for the edge to be located up on the corresponding side wall 48 such that a flange 60 is formed that extends and covers some part of the corresponding side wall 48. Other edges such as edge 22, on the other hand, may terminate somewhere along the corresponding bottom edge 50, such that a shorter or smaller flange 62 is formed; that is the sound damping patch does not need to completely extend through the entire bottom edge 50 and may instead terminate on the bottom edge 50. These flanges, such as 60 and 62 for example, may also be referred to as sound damping features because, as described below, their presence and/or absence can affect the sound damping performance of the sound damping patch. These and other types of sound damping features can extend from the main panel area 20 of the sound damping patch 14, through one or more bottom edges of the main panel 12, and at least part way up the corresponding side walls 18. In one embodiment, main panel 12 includes first and second side walls 18, and a first sound damping feature extends further up the first side wall than a second damping feature extends up the second side wall. The exact size, shape, etc. of the sound damping patch 14 and its edges, flanges, and sound damping features may be affected by a number of factors, including those concerning clearance between the sound damping blank and the forming die, as well as sound damping performance.

For instance, it is generally preferable for sound damping purposes that the sides or edges 22-28 of sound damping patch 14 extend through at least 50% of each bottom edge or radius 50-56; however, this is not always practical. The further up the adjacent side wall that sound damping patch 14 extends, the greater the sound damping or vibration reduction that is likely to occur. A "breathing mode" refers to a phenomenon that sometimes occurs when two adjacent walls or surfaces in a vibrational environment move in and out together in a somewhat coordinated fashion, and may occur in structures like vehicle floor tub 10 with adjacent walls such as the bottom wall and side wall of the vehicle floor tub. By extending significantly up side wall 48, flange 60 may be able to disrupt or interfere with this breathing mode in such a way that the vibrational or acoustic energy in that area is reduced. In other words, because adjacent or connected walls, such as the bottom wall and side walls, may move together when subjected to certain vibrational modes, damping one of the adjacent walls can assist in damping the other adjacent wall. However, the larger the sound damping patch 14, the more material and weight that is added to the vehicle.

In addition, there are certain forming or manufacturing issues that may affect the size and shape of the sound damping patch 14 and the blank from which it is formed. For example, FIGS. 4-7 illustrate a portion of an exemplary stamping or forming die where an upper die half 70 interacts with a lower die half 72 and a binder component 74 to form a finished vehicle floor tub (note that the figures are not to scale; in particular, the blank thicknesses in relation to the adhesive layer located between them are not to scale). This type of configuration is typically used in forming operations in which it is desired to prevent the material or materials being formed from simply being pulled into the die cavity during the stamping or drawing operation. This type of forming die operates as follows. The top surfaces of the lower die half 72 and the binder component 74 are generally aligned with one another so that they lie approximately in the same plane, or so that the highest point of the lower die half 72 is at or below the level of the binder top surface. The material to be formed is then placed between the die halves 70, 72 so that the periphery of the material rests on the binder component 74. The upper die half 70 is then moved toward the lower die half 72 and binder component 74 so that it first contacts the periphery of the material to be formed, trapping it against the binder component 74. The upper die half continues to move toward the lower die half 72, and the binder moves with the upper die half, keeping the periphery of the material trapped therebetween as the lower die half forms the material into the cavity of the upper die half. In this manner, the material is stretched or placed in a draw condition rather than being allowed to slip into the die. Some binders may be configured to allow controlled slippage of material into the die.

In FIGS. 4-5, the sound damping blank 14, shown facing down in the forming die, has edges that extend outwards in order to extend through the radii or bottom edges and up onto the side wall formed in the vehicle floor tub. However, this results in the outer edges or portions of both the main blank 12 and the sound damping blank 14 being trapped between the upper die 70 and binder component 72, or caught in a "pinch zone." If the stamping die is not designed to accommodate such a work piece, this may result in manufacturing difficulties, interference issues, etc. For example, if sound damping blank 14 is placed in such a draw condition, it can be damaged during forming, partly because of the smaller amount of material it has to "draw" from as the material stretches in multiple directions.

In FIGS. 6-7, the sound damping blank 14 has edges that are designed to terminate along the bottom edges of the vehicle floor tub after it is formed. This results in only the outer edges or portions of the main blank 12 being trapped between the upper die 70 and binder component 72. In this manner, only the main blank 12 is placed in a draw condition and the sound damping blank 14 is not; rather the sound damping blank, being securely attached to the main blank by the adhesive layer and/or various spot welds, is allowed to move with the bottom wall area of the main blank 12.

FIG. 8 is a cross-sectional view taken through the binder of the forming die of FIGS. 6-7 before forming One way to ensure that the forming die can accommodate a main blank and sound damping blank assembly is to size and shape the outer perimeter 38 of the sound damping blank 14 and an inner perimeter 76 of the binder component 74 such that there is clearance between them. Of course, this is only one way a forming die can be configured to accommodate a main blank and sound damping blank assembly. Others exist, including methods that place the sound damping blank 14 in a draw condition during only a first segment of the forming operation.

Referring now to FIG. 9, sound damping blank 14 includes exemplary forming features 30-36 that are designed to isolate or separate certain parts of the sound damping blank 14 from others in order to assist with a stamping, drawing or other metal forming process. For instance, in the finished vehicle floor tub 10 shown in FIG. 3, flange 60 of the sound damping blank may experience different stress and strain during forming than flange 62, even though the two are located adjacent one another. Forming feature 36 separates these two sides or edges in a way that enables the two sides to be decoupled from one another, from a stamping or forming perspective. Exemplary forming features 30-36 are located along the outer perimeter 38 of sound damping blank 14, but could be located elsewhere instead.

Referring to FIG. 10, there is shown an enlarged view of an exemplary forming feature 34 that is in the form of a relief notch, and includes two outwardly curved segments 80, 82 and one inwardly curved segment 84 located between the outwardly curved segments. The outwardly curved segments 80, 82 are located on the outside of the relief notch and generally extend in an outward or convex fashion that points away from the sound damping blank 14. The inwardly curved segment 84, on the other hand, is a generally concave feature that is sandwiched between the two outwardly curved segments 80, 82. In one embodiment, inwardly curved segment 84 is formed with at least one radius of approximately 40-60 mm. Skilled artisans will appreciate that while the curvilinear design of forming features 30-36 may be useful for decoupling or separating adjacent sound damping blank edges, it is not the only arrangement or design that may be used. For example, in another exemplary embodiment shown in FIG. 11, forming feature 34' is in the form of a relief notch having a different shape than that of relief notch 34. In this embodiment, the relief notch 34' includes two outwardly curved segments 80', 82' and a linear segment 84' located between the outwardly curved segments. Other forming features having different configurations may be used in place of the exemplary ones shown here. For example, forming features having a fewer or greater number of curved segments, having segments other than curved segments, and having curved segments with different radii may be used, to cite several possibilities. Forming features may also include features that are not in the form relief notches, such as features that are formed in the interior of the sound damping blank, or that are formed along straightaway sections of the perimeter 38, as opposed to being at the corners.

Forming features may also be described by other dimensions and attributes such as their orientation and/or relationships among various portions of an individual forming feature. For instance, referring again to FIG. 10, an imaginary line L connects the two outwardly curved segments 80, 82 of relief notch 34. Line L forms angles $\alpha$ and $\beta$ with the adjacent edges 26 and 28, respectively. According to the exemplary embodiment shown here, angles $\alpha$ and $\beta$ are obtuse angles and are not equal to one another. Research and testing has shown that if the material movement of the sound damping blank 14 near angle $\alpha$ is significant during forming of the vehicle floor tub, then it may be preferable to increase angle $\alpha$; the same goes for angle $\beta$. Thus, for forming features 30-36, it may be preferable to have two angles $\alpha$ and $\beta$, where the size of the angles is influenced by the amount and/or nature of material movement or stretching that occurs during the forming process. More specifically, the more the material movement, the greater the obtuse angle. A distance X is generally defined as the distance between a line L, which connects the two outwardly curved segments 80, 82 of the exemplary forming feature, and the deepest point P of the inwardly curved segment. An optimal distance X can depend on a number of factors, but may be between 10-100 mm for the embodiment shown here. Generally speaking, the greater the stretching in the area of forming feature 34, the greater the distance X. In one embodiment, such as that shown in FIG. 1, where exemplary sound damping patch 14 is attached to main blank 12, the deepest point P of the inwardly curved segment 84 of each forming feature is located on the bottom wall area 16 of the main blank. In another embodiment, the deepest point P of each forming feature lies on the bottom wall area before a forming process, and also lies on the bottom wall after the forming process. In yet another embodiment, inwardly curved segment 84 comprises a radius R that has a center point Y, where the deepest point P lies on the bottom wall area of the main blank, and the center point Y of the radius lies on the side wall area of the main blank.

The adhesive layer may be in contact with the main blank or main panel 12 and the sound damping blank or patch 14 and bonds the two components together before the forming process so that the main blank 12 and the sound damping blank 14 can be formed together into vehicle floor tub 10. Depending on its composition and on the particular application in which it is used, the adhesive layer can perform other functions such as vibration and/or noise damping. According to one exemplary embodiment, the adhesive layer is a viscoelastic adhesive layer that is comprised of an acrylate-based thermoset resin and has a thickness of about 0.01 mm to 0.1 mm; however, other adhesive compositions and thicknesses may be used as well. For example, in certain instances, the adhesive layer thickness may preferably be 0.02-0.4 mm. Main blank 12 and sound damping blank 14 may be made from any number of different materials, including hard plastics and metals such as stainless steel, galvanized steel, cold rolled steel (non-coated, coated, painted, etc.), aluminum, and alloys thereof. And, depending on the materials used, main blank 12 and sound damping patch 14 can originate from a coil of rolled stock material or from flat blanks that have already been blanked, trimmed, stamped, or otherwise worked into individual pieces.

Figure 12:
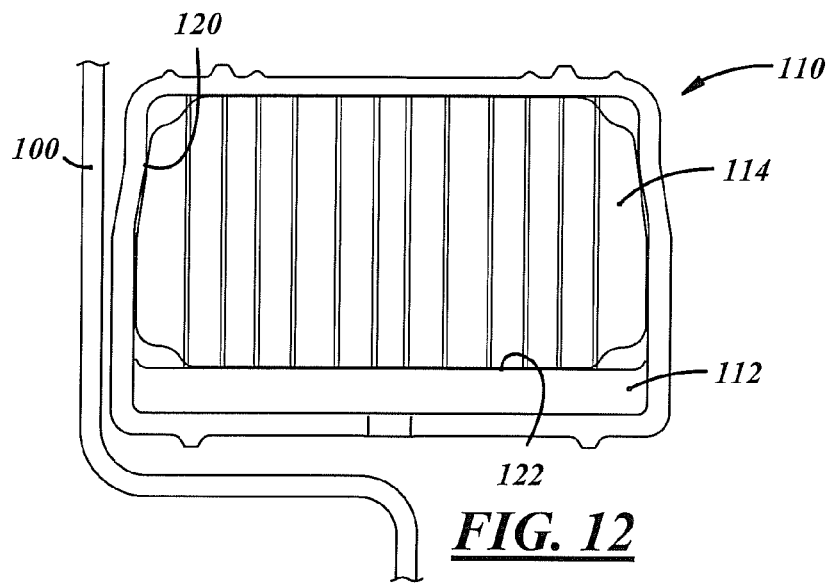
FIG. 12 is a top view of an exemplary vehicle floor tub, showing a vehicle exhaust pipe extending partially around the tub.

FIGS. 12-18 illustrate several different aspects and alternative embodiments of the vehicle floor tub. For example, FIG. 12 shows a vehicle exhaust pipe 100 extending or snaking around a vehicle floor tub 110. In this particular application, it is generally known that the exhaust pipe may act as a noise and/or a heat source that could increase or otherwise alter the vibrational or acoustical energy in the adjacent areas of the vehicle floor tub. Thus, the sound damping patch 114 may have flanges 120 and 122 that are larger (i.e., that extend further up the side walls of the vehicle floor tub) in the areas of the vehicle floor tub that are proximate the exhaust pipe 100. In such applications, it is also possible to attach more than one sound damping patch to the vehicle floor tub, with each sound damping patch having different performance characteristics. For example, the portion of the vehicle floor tub nearest the exhaust pipe may include a sound damping patch that utilizes different or thicker materials for the patch and/or for the adhesive layer that attaches it to the main panel 112 than for a patch located further away from the exhaust pipe 100. The sound damping patch 114 may thus be tailored or custom designed to address different known noise sources.

Figure 13:
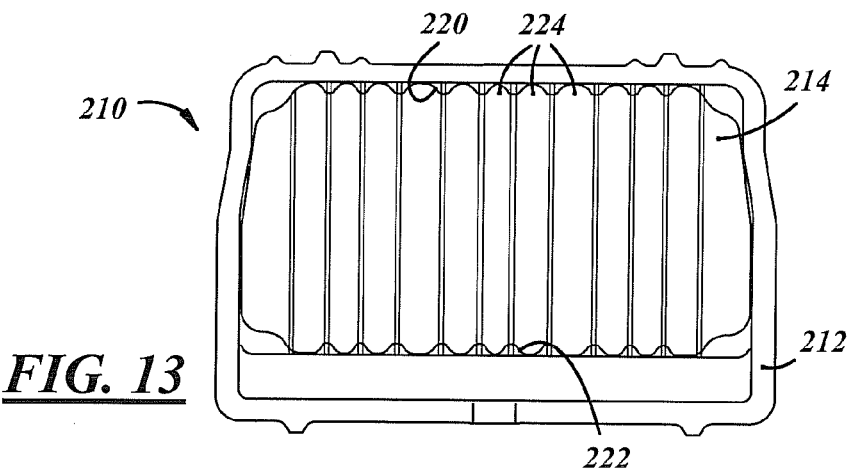
FIG. 13 is a top view of another exemplary vehicle floor tub, where the sound damping patch includes a plurality of sound damping features.
Figure 14:
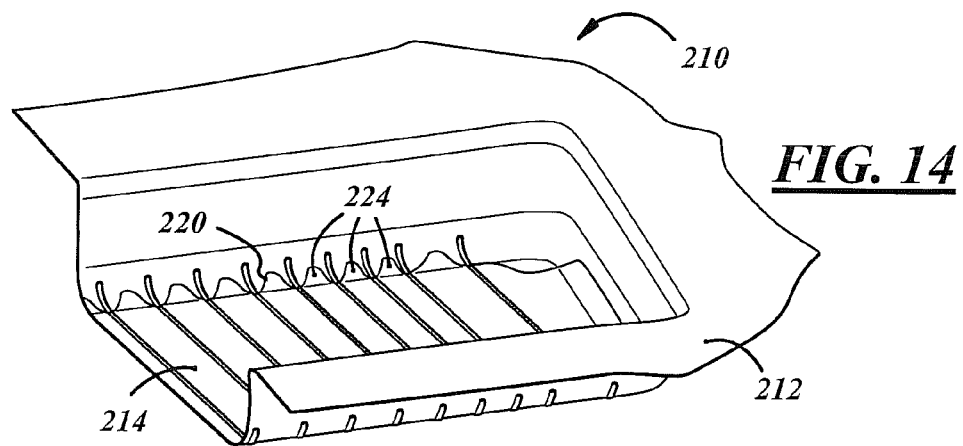
FIG. 14 is a partial perspective view of an exemplary vehicle floor tub similar to that shown in FIG. 13.

FIGS. 13 and 14 show embodiments of a vehicle floor tub 210 where the sound damping patch 214 has one or more edges 220, 222 that have a series of undulating or tapered fingers 224 instead of being linear or straight. The undulating or scalloped design of edges 220, 222 may be helpful in disrupting certain vibration modes, such as the breathing mode described earlier, in the vehicle floor tub. The fingers 224 are a type of sound damping feature and are located along the outer perimeter of the sound damping patch 214, extending from the bottom wall, through the bottom edge of the main panel 212, and at least part way up the corresponding side wall so that they at least partially cover the side wall. The individual fingers 224 may be tailored to meet localized vibrational requirements and address nearby vibration sources; the greater the vibrational source, the larger the nearby finger, for example. Other embodiments are certainly possible, as FIGS. 13 and 14 only illustrate one possibility.

Figure 15:
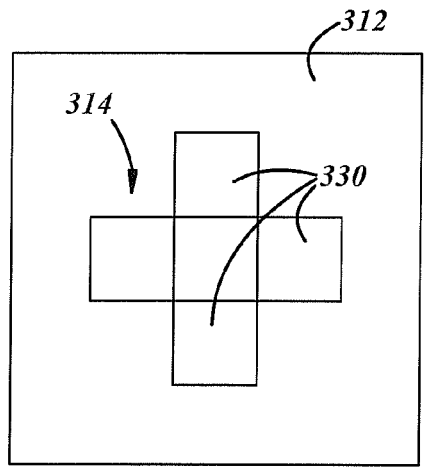
FIG. 15 is a top view of another exemplary assembly that may be used to form a vehicle floor tub and includes a main blank and multiple sound damping blanks.
Figure 16:
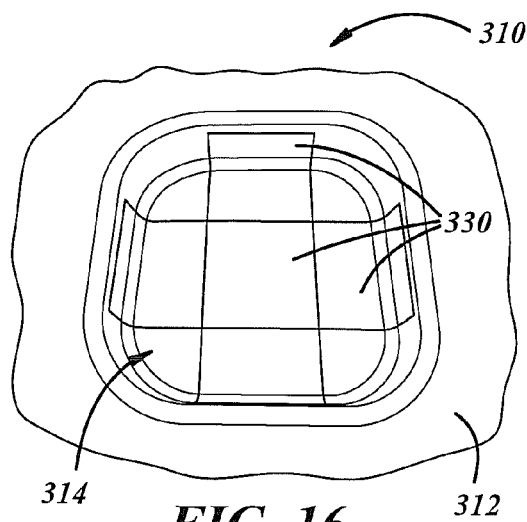
FIG. 16 is a perspective view of an exemplary vehicle floor tub that can be formed using the exemplary assembly of FIG. 15.

FIGS. 15 and 16 show an alternative embodiment where a single vehicle floor tub 310, includes a sound damping patch assembly 314 having four separate sound damping patches 330 attached to a single main panel 312. FIG. 15 shows an exemplary main blank 312 and sound damping patch assembly 314 from which vehicle floor tub 310 may be formed. It should be appreciated that any number and combination of sound damping patches or other components may be attached to the main panel, including patches of different shapes and sizes than those shown here.

Figure 17:
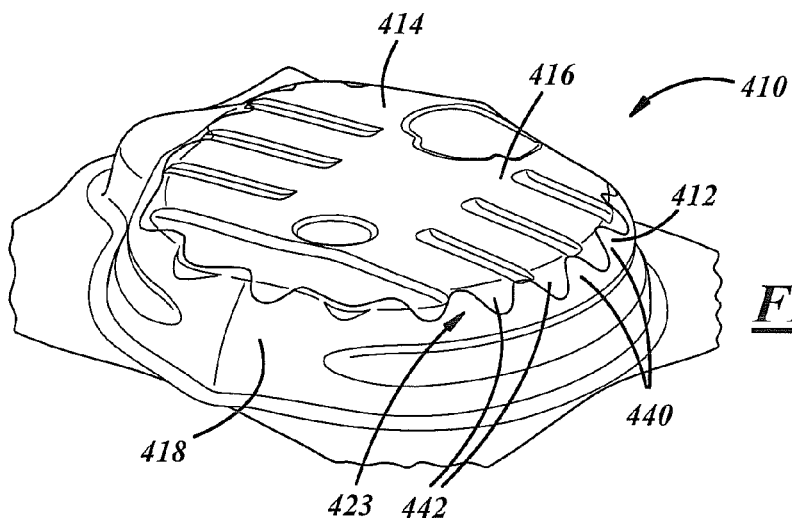
FIG. 17 is a perspective view of the bottom of another exemplary vehicle floor tub that may accommodate a spare wheel showing the sound damping patch on the exterior of the tub.
Figure 18:
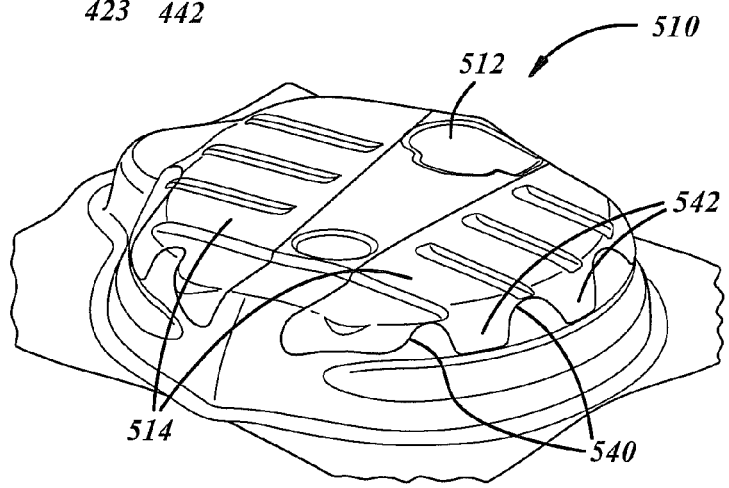
FIG. 18 is a perspective view of the bottom of yet another exemplary vehicle floor tub that may accommodate a spare wheel showing multiple sound damping patches on the exterior of the tub.

FIGS. 17 and 18 show additional embodiments of vehicle floor tubs where the main panel is generally round in shape, as opposed to rectangular. Both figures show the bottom or underside of the floor tub. These types of vehicle floor tubs may be useful for storage of a vehicle spare tire and wheel, for example. FIG. 17 illustrates a vehicle floor tub 410 having a main panel 412 with a sound damping patch 414 attached to an exterior surface of the main panel 412. The sound damping patch includes a plurality of forming features 440 and sound damping features 442 located along its outer perimeter, where features 440 and 442 form an undulating or scalloped perimeter. This embodiment also illustrates an example of a complex stress region 423 located near a junction between the bottom wall 416 and curved side wall 418. Thus, an alternating series of sound damping features 142 and forming features 140 may be continuously located along the perimeter of the sound damping patch. FIG. 18 illustrates a similar embodiment of vehicle floor tub 510 that includes two sound damping patches 514 rather than one. Like the embodiment of FIG. 17, it includes an alternating series of forming features 540 and sound damping features 542 arranged along the perimeter of the sound damping patches 514.

In an exemplary forming process, the sound damping blank 14 is joined to main blank 12 with the adhesive layer before either part is stamped, drawn or otherwise formed into a finished part. In one embodiment, both the sound damping blank and the main blank are substantially flat planar pieces at the time that they are adhered and/or spot welded together. See FIG. 1 for an exemplary spot welding pattern that may be used to better maintain the two blanks together in a subsequent forming process; such a technique may reduce the discrepancies in material flow between the sound damping blank and the main blank during forming The adhesive layer may be applied to either the main blank or the sound damping blank, or to both, as a curable adhesive layer and cured thereafter to form the adhesive layer. After the sound damping blank 14 is adequately located on and attached to the main blank 12, such as by an adhesive layer, spot welds, etc., both components can be put through a stamping, drawing, or other forming process together so that the main blank, the sound damping blank, and the adhesive layer are formed together into a vehicle floor tub having a main panel, a sound damping patch, and an adhesive layer. In one embodiment, the main blank is placed in a draw condition and the sound damping blank is placed in a non-draw condition during the forming process. This process ensures that the resultant vehicle floor tub has a more integrated form with tighter tolerances and better correspondence between the main panel 12 and sound damping patch 14. Such a combined stamping, drawing or forming process also results in the elimination of a manufacturing step, as the sound damping patch and main blank do not need to be separately stamped. Other advantages may also exist from using a combined forming process like the one described above.

It is to be understood that the foregoing description is not a definition of the invention itself, but is a description of one or more preferred exemplary embodiments of the invention. The invention is not limited to the particular embodiment(s) disclosed herein. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example", "e.g.," "for instance", "like", and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle floor tub, comprising:
a main panel having a bottom wall, a side wall, and a complex stress region, the complex stress region is located near a junction between the bottom wall and the side wall and experiences complex material flow during a forming process;
a sound damping patch being smaller than the main panel and having a forming feature; and
an adhesive layer being in contact with the main panel and the sound damping patch such that the adhesive layer bonds the main panel and the sound damping patch together before the forming process so that the main panel and the sound damping patch can be formed together, wherein during the forming process the forming feature prevents some of the stress from the complex stress region from transferring from the main panel to the sound damping patch.

2. The vehicle floor tub of claim 1, wherein the forming feature comprises a relief notch that is located along an outer perimeter of the sound damping patch and near the complex stress region when the main panel and the sound damping patch are formed together.

3. The vehicle floor tub of claim 1, wherein the main panel further comprises a bottom edge that is located at the junction between the bottom wall and the side wall and at least partially extends along the length of the junction, and the sound damping panel further comprises a plurality of sound damping features, wherein after the forming process the plurality of sound damping features extend from the sound damping patch, through the bottom edge, and at least part way up the side wall of the main panel.

4. The vehicle floor tub of claim 1 wherein the main panel comprises an upper rim that attaches to a vehicle floor panel, and the vehicle floor tub is sized and configured to be a vehicle seat tub that is located in the floor and accommodates a folded or collapsed vehicle seat.

5. A vehicle floor tub, comprising:
a main panel having a bottom wall, a side wall, and a bottom edge, the bottom edge is located at a junction between the bottom wall and the side wall and at least partially extends along the length of the junction;
a sound damping patch being smaller than the main panel and having a plurality of sound damping features; and
an adhesive layer being in contact with the main panel and the sound damping patch such that the adhesive layer bonds the main panel and the sound damping patch together before a forming process so that the main panel and the sound damping patch can be formed together, wherein after the forming process the plurality of sound damping features extend from the sound damping patch, through the bottom edge, and at least part way up the side wall of the main panel.

6. The vehicle floor tub of claim 5 wherein the plurality of sound damping features comprises a series of tapered fingers that is located along an outer perimeter of the sound damping patch and at least partially cover the side wall after the main panel and the sound damping patch are formed together.

7. The vehicle floor tub of claim 5, wherein the main panel comprises a complex stress region that is located near the junction between the bottom wall and the side wall and experiences complex material flow during the forming process, and the sound damping patch comprises a forming feature that is located along an outer perimeter of the sound damping patch, so that during the forming process the forming feature prevents some of the stress from the complex stress region from transferring from the main panel to the sound damping patch.

8. The vehicle floor tub of claim 5, wherein the main panel includes first and second side walls, and a first sound damping feature extends further up the first side wall than a second sound damping feature extends up the second side wall.

9. The vehicle floor tub of claim 3, wherein the plurality of sound damping features comprises a series of tapered fingers that is located along an outer perimeter of the sound damping patch and at least partially cover the side wall after the main panel and the sound damping patch are formed together.

10. The vehicle floor tub of claim 1, further comprising a plurality of spot welds joining the main blank and the sound damping blank together at select weld locations, the select weld locations are arranged near the outer perimeter of the sound damping blank.

11. The vehicle floor tub of claim 7, further comprising a plurality of spot welds joining the main blank and the sound damping blank together at select weld locations, the select weld locations are arranged near the outer perimeter of the sound damping blank.

* * * * *